United States Patent [19]

Calistrat

[11] 4,191,030
[45] Mar. 4, 1980

[54] DIAPHRAGM COUPLING

[75] Inventor: Michael M. Calistrat, Sykesville, Md.

[73] Assignee: Koppers Company, Inc., Pittsburgh, Pa.

[21] Appl. No.: 935,581

[22] Filed: Aug. 21, 1978

[51] Int. Cl.² .............................................. F16D 3/78
[52] U.S. Cl. ...................................... 64/13; 64/11 F; 64/15 B
[58] Field of Search ............ 64/13, 11 R, 11 F, 15 D, 64/15 B

[56] References Cited

U.S. PATENT DOCUMENTS

| 2,593,877 | 4/1952 | Hagenlocher | 64/13 |
| 2,745,267 | 5/1956 | Hagenlocher | 64/13 |
| 2,871,683 | 2/1959 | Hallewell | 64/13 |
| 4,096,711 | 6/1978 | Carlson | 64/13 |

Primary Examiner—Ira S. Lazarus
Attorney, Agent, or Firm—Thomas L. Sivak; Oscar B. Brumback

[57] ABSTRACT

An improved flexible diaphragm coupling including a floating shaft connector having flexible discs welded thereto, the flexible discs connected to axially spaced, coaxially aligned shaft mounted hubs, pilot rings surrounding the discs for aligning the assembly with the hubs and damper means fixed to the floating shaft and the pilot rings. The damper means which includes an elastomeric inner ring serves to dampen axial oscillations of the coupling assembly and seals the disc element from adverse contaminants.

3 Claims, 1 Drawing Figure

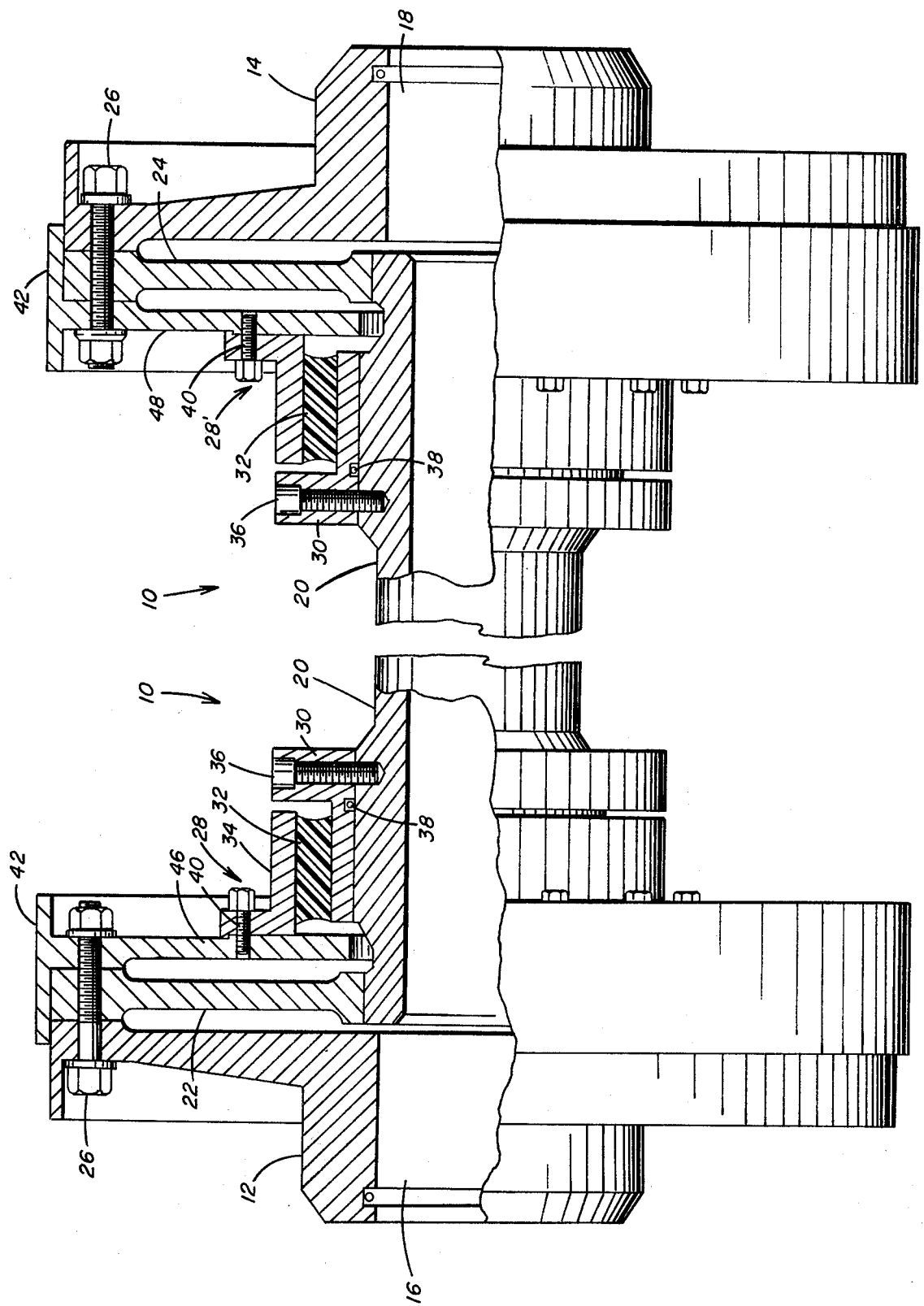

DIAPHRAGM COUPLING

BACKGROUND OF THE INVENTION

1. Field of the Invention

This invention relates generally to flexible shaft couplings and more particularly to couplings utilizing a yielding disc element for transmitting rotary motion between substantially coaxially aligned shafts.

2. Description of the Prior Art

Shaft couplings using flexible metal diaphragms to compensate for misalignment of the connected shafts are well known. Such couplings use yielding metal diaphragms or discs, connected to hubs on the shafts, that flex during rotation to accommodate shaft misalignment. Examples of such couplings are shown in Troeger et al. U.S. Pat. No. 2,883,839, Anderson et al. U.S. Pat. No. 3,808,837 and Jencick U.S. Pat. No. 1,283,787.

Shaft couplings using flexible metal diaphragms are subject to two inherent disadvantages which heretofore consistently troubled prior art couplings. The first problem is that flexible metal diaphragm couplings are capable of axial vibrations. The critical frequency of the vibrations often falls within the operating speed range of the coupling, an occurrence which often leads to coupling failures. The prior art has sought to minimize this problem by either increasing the weight of the floating shaft to decrease the critical frequency; or to use a stiffer disc thereby increasing the critical frequency. Both prior art solutions have not proved satisfactory. The former causes the coupling to go through its critical frequency while the machinery is coming up to operating speed and the latter limits the maximum axial movement of the floating shaft between the fixed shafts, which movement is originally very limited. The second disadvantage of flexible metal disc couplings is that they are very sensitive to corrosion. While presently the discs are covered with various protective coatings, the coatings have not been successful in resisting the many environments, oil, sand, hydrogen, chlorides, etc. in which which couplings are used.

Accordingly, it is the general object of this invention to provide a shaft coupling using flexible metal diaphragms which are not susceptible to failures from axial vibration or corrosion.

SUMMARY OF THE INVENTION

The foregoing and other objects are generally achieved by a flexible metal diaphragm assembly for connecting a pair of axially spaced, shaft mounted coupling hubs, the assembly including flexible metal diaphragms adjacent the hubs that are connected to a floating shaft. Pilot rings surround the diaphragm and are adapted to extend over the coupling hubs to pilot the assembly during installation. The pilot rings include radially extended flanges which are adapted to contain the flexible diaphragms in the event of a catastrophic failure of the coupling. Fixed to the radial flanges of the pilot rings and the floating shaft is a damper and seal means. The damper and seal ring includes an outer ring member which is fixed to the radial flange of the pilot ring and an inside ring member which is fixed to the floating shaft. Bonded to and extending between the surfaces of the rings is an elastomeric element. The damper and seal means effectively dampen vibration of the coupling and protects the flexible metal disc from corroding agents.

The above and further objects and novel features of the invention will appear more fully in the following detailed description when read in connection with the accompanying drawing, it being understood that the drawing is not intended as a definition of the invention but is for the purpose of illustration only.

BRIEF DESCRIPTION OF THE DRAWING

The drawing FIGURE is a side elevational view partially in cross section of the diaphragm coupling assembly of the present invention.

DESCRIPTION OF THE PREFERRED EMBODIMENT

The drawing FIGURE illustrates the diaphragm coupling assembly of the present invention in which 10 generally denotes the diaphragm assembly secured between a pair of substantially coaxially aligned coupling hubs 12 and 14. Hubs 12 and 14 are mounted on a driving shaft 16 and a driven shaft 18 by means well known and understood in the art such as keys or set screws, not shown.

Assembly 10 comprises a floating shaft 20 and a pair of flexible metal diaphragms 22 and 24. The diaphragms 22 and 24 are electron-beam welded to the floating shaft 20 and are connected by a plurality of threaded connectors 26 to hubs 12 and 14. Thus, rotation of shaft 16 rotates shaft 18 through hub 12, assembly 10 and hub 14.

The damper and pilot means 28 and 28' of the present invention is comprised of an inside ring 30, a center ring of an elastomeric material 32 and an outside ring 34. Inner rings 30 are fixed to the floating shaft 20 by a threaded connector 36. Conventional seal means 38 is fixed between the inside ring 30 and the floating shaft to inhibit the path of corrosive agents to the diaphragms 22 and 24. Center ring 32 which is comprised of an elastomeric material such as butyl is bonded to the outside surface of ring 30 and the inside surface of outer ring 34. Outer ring 34 is fixed by threaded connector means 40 to the pilot ring 42. Pilot ring 42 is fixed to the diaphragms 22 and 24 and hubs 12 and 14 by connectors 26. In operation, damper and pilot means reduce the vibration of the entire coupling.

In certain applications, where metal diaphragm couplings are used, it may be advantageous or economical to use a single pilot and damper of the present invention on either the driving or driven end of the coupling. Further, the outer ring 34 could be formed as an integral part of the inner ring 30. While I have described certain preferred embodiments of my invention, it will be understood that it may be otherwise embodied within the scope of the following claims.

What is claimed:

1. An improved metal diaphragm assembly for connecting a pair of axially spaced shaft mounted coupling hubs, the assembly including a pair of axially spaced flexible metal diaphragms, adjacent the hubs, said diaphragms being fixed to a floating shaft, and pilot ring means fixed to said diaphragms and said hubs, the improvement comprising:

a pilot and damper means including:
  (i) first ring means fixed to said floating shaft,
  (ii) second ring means fixed to said first ring means, said second ring means adapted to absorb vibrations of said assembly; and (iii) third ring means fixed to said second ring means, said third ring means being operably connected to said pilot ring means.

2. The improved metal diaphragm assembly of claim 1 wherein said second ring means is an elastomer which is bonded to the inner surfaces of said second and third ring means.

3. The improved metal diaphragm assembly of claim 2 wherein a sealing member is operably engaged between said first ring means and said floating shaft.

* * * * *